(12) United States Patent
Chandrasekaran et al.

(10) Patent No.: US 8,700,782 B2
(45) Date of Patent: Apr. 15, 2014

(54) DIRECTING MODALITIES OVER DIFFERENT NETWORKS IN MULTIMODAL COMMUNICATIONS

(75) Inventors: Subramanian Chandrasekaran, Redmond, WA (US); Anthony Bell, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 12/858,601

(22) Filed: Aug. 18, 2010

(65) Prior Publication Data

US 2012/0047270 A1 Feb. 23, 2012

(51) Int. Cl.
*G06F 15/16* (2006.01)
*H04L 29/08* (2006.01)

(52) U.S. Cl.
CPC .............................. *H04L 29/08576* (2013.01)
USPC ........... 709/227; 709/217; 709/218; 709/219; 709/220; 709/221; 709/222; 709/223; 709/224; 709/225; 709/226; 709/228; 709/229; 709/230; 709/232; 709/233; 709/234; 709/238; 709/239; 709/240; 709/241; 709/242; 370/329; 370/216; 370/338; 370/389; 370/401; 370/351; 370/352; 370/353; 370/354; 370/356; 370/400

(58) Field of Classification Search
USPC ......... 709/223, 224, 225, 226, 227, 228, 229, 709/230, 232, 233, 234, 238, 239, 240, 241, 709/242, 217, 218, 219, 220, 221, 222; 370/329, 216, 338, 389, 401, 351, 352, 370/353, 354, 356, 400
See application file for complete search history.

(56) References Cited

U.S. PATENT DOCUMENTS

| | | | | |
|---|---|---|---|---|
| 6,748,446 | B2 * | 6/2004 | Sato et al. | 709/241 |
| 7,386,611 | B2 | 6/2008 | Dias et al. | |
| 7,415,537 | B1 * | 8/2008 | Maes | 709/246 |
| 7,734,726 | B2 | 6/2010 | Dantzig et al. | |
| 7,941,557 | B2 * | 5/2011 | Zhu et al. | 709/238 |
| 8,238,356 | B2 * | 8/2012 | Nakamura et al. | 370/401 |
| 2002/0052965 | A1 * | 5/2002 | Dowling | 709/230 |
| 2004/0128342 | A1 * | 7/2004 | Maes et al. | 709/200 |
| 2006/0069782 | A1 * | 3/2006 | Manning et al. | 709/227 |
| 2006/0195605 | A1 * | 8/2006 | Sundarrajan et al. | 709/232 |
| 2008/0092157 | A1 * | 4/2008 | Walter et al. | 725/25 |
| 2009/0054058 | A1 * | 2/2009 | Andreasson et al. | 455/426.1 |
| 2009/0171659 | A1 * | 7/2009 | Pearce et al. | 704/235 |
| 2009/0252136 | A1 * | 10/2009 | Mahany et al. | 370/338 |
| 2010/0020812 | A1 * | 1/2010 | Nakamura et al. | 370/401 |
| 2010/0124196 | A1 * | 5/2010 | Bonar et al. | 370/329 |
| 2010/0131672 | A1 * | 5/2010 | Karaoguz et al. | 709/238 |

(Continued)

OTHER PUBLICATIONS

"Cisco Application Networking for SAP Solutions", Retrieved at <<http://www.cisco.com/en/US/solutions/collateral/ns340/ns517/ns224/ns377/solution_overview_c22-447528.pdf>> Published Date: 2008, p. 1-8.

(Continued)

*Primary Examiner* — Saket K Daftuar
(74) *Attorney, Agent, or Firm* — Sonia Cooper; Alin Corie; Micky Minhas

(57) ABSTRACT

Selected modalities of a multimodal communication session may be diverted over different networks by an administrator or automatically to reduce burden on utilized networks. Modalities may be selected and diverted over different networks including the Internet for the same multimodal communication session based on network conditions, communication session attributes, participant attributes, and similar factors.

20 Claims, 7 Drawing Sheets

(56) References Cited

U.S. PATENT DOCUMENTS

2010/0220585 A1* 9/2010 Poulson et al. ............... 370/216
2010/0257281 A1* 10/2010 Patel et al. .................... 709/239
2010/0296483 A1* 11/2010 Sayeedi et al. ................ 370/331
2010/0318665 A1* 12/2010 Demmer et al. .............. 709/227
2011/0047592 A1* 2/2011 Feder et al. ....................... 726/1

OTHER PUBLICATIONS

"Offloading Point to Point Protocol over Ethernet (PPPoE) from Your Network", Retrieved at <<http://www.finepoint.com/white-papers/offloading-pppoe.pdf>> Published Date: Oct. 16, 2006, p. 1-11.

"Broadcom Ethernet Network Controller Enhanced Virtualization Functionality", Retrieved at <<http://www.broadcom.com/collateral/wp/Virtualization-WP100-R.pdf, Published Date: Oct. 2009, p. 1-10.

"Benefits of BIG-IP Application Optimization Over the WAN", Retrieved at <<http://www.f5.com/pdf/white-papers/app-optimization-wp.pdf, Published Date: May, 2005, p. 1-6.

"Intelligent, high performance application delivery", Retrieved at <<http://www.coyotepoint.com/products/e650.php, Retrieved Date: Jun. 15, 2010, p. 1-3.

"AscenLink WAN Traffic Management", Retrieved at <<http://www.crawfordtech.co.nz/datasheets/XTERA_wan_ascenlink_data_sheet%5B1%5D.pdf<< Retrieved Date: Jun. 15, 2010, p. 1-6.

"Alternative Backhaul and Data Offload Solutions for GSM and UMTS Operators"—http://www.cisco.com/en/US/prod/collateral/routers/ps4062/prod_brochure0900aecd8032c176.html>> Retrieved Date: Jun. 15, 2010, p. 5.

* cited by examiner

DIRECTING MODALITIES OVER DIFFERENT NETWORKS IN MULTIMODAL COMMUNICATIONS

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

Enhanced communication systems providing multi-modal communications operate in a similar fashion to (sometimes the same) data exchange networks where designated servers and their backups provide services (e.g. routing of calls). Session Initiation Protocol (SIP) is a commonly used communication protocol between components of such systems. With the increase in usage of real-time collaboration such as audio, video, and application sharing, the burden on enterprise data networks has been raised. While certain modalities may be preferred to be streamed through enterprise network for various reasons, some modalities—though critical to the collaboration experience—may be too expensive to burden enterprise data network with.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to diverting select modalities of a multimodal communication session over different networks to reduce burden on utilized networks. According to some embodiments, administrators may be enabled to select modalities that use an enterprise network and offload other modalities to the Internet. According to other embodiments, modalities may be selected and diverted automatically over different networks for the same multimodal communication session based on network conditions, communication session attributes, participant attributes, and similar factors providing flexibility of controlling the media traffic within an enterprise network with richness of all collaboration modalities.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
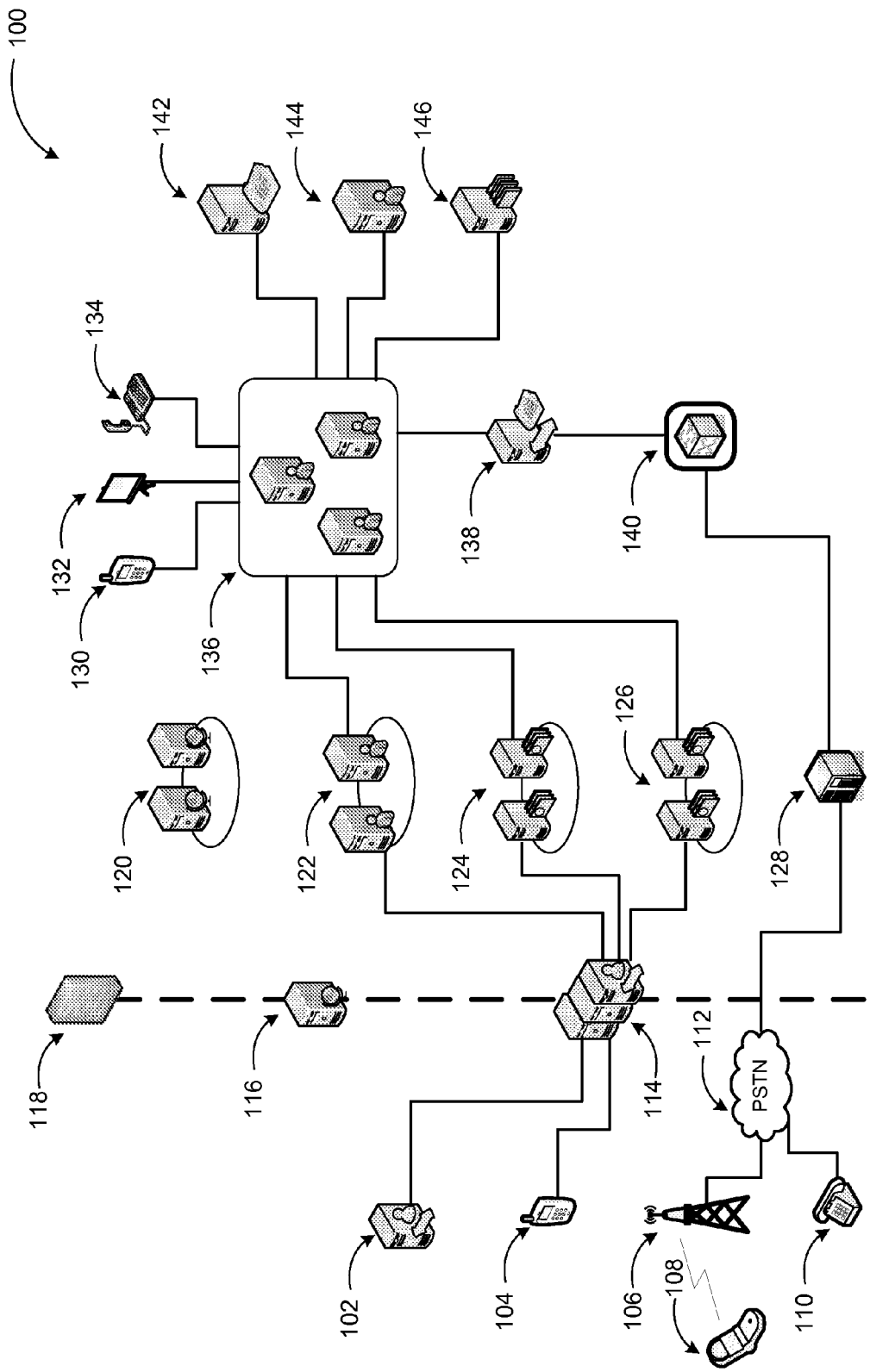
FIG. 1 is a diagram illustrating an example enhanced communications system such as a UC system, where embodiments may be implemented for providing modality diversion.

As briefly described above, select modalities of a multimodal communication session may be diverted over different networks to reduce burden on the utilized networks. For example, administrators may be enabled to select modalities that use an enterprise network and offload other modalities to the Internet. Alternatively, modalities may be selected and diverted automatically over different networks for the same multimodal communication session based on network conditions, communication session attributes, participant attributes, and comparable factors. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "site" as used herein refers to a geographical location and may include data centers, branch offices, and similar communication sub-systems. The term "call" refers to multimodal communication sessions, examples of which are discussed below. Thus, a "call" is not limited to audio communications. Furthermore, the term cluster refers to a group of physical and/or virtual servers, which may provide the same service to a client in a transparent manner (i.e., the client sees a single server, while the cluster may have a plurality of servers).

FIG. 1 includes diagram 100 illustrating an example enhanced communications system such as a UC system, where embodiments may be implemented for diverting select modalities of multimodal communications. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices 130, 132, 134, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) 128 to a Public Switched Telephone Network (PSTN) 112. Further communications through PSTN 112 may be established with a telephone 110 or cellular phone 108 via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enables connectivity through UC network(s) with other users such as remote user 104 or federated server 102 (for providing connection to remote sites). A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct functionalities may reside. The clusters may include web servers for communication services 120, directory servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 is also referred to as a data center. A UC system may have one or more data centers, each of which may be at a different site. Registrar servers in the pool register end points 130, 132, and 134, and facilitate their communications through the system acting as home servers of the end points. User services server(s) may provide presence, backup monitoring, and comparable management functionalities. Pool 136 may include a cluster of registrar servers. The registrar servers may act as backups to each other. The cluster of registrar servers may also have backup clusters in other data servers as described later.

Mediation server 138 mediates signaling and media to and from other types of networks such as a PSTN or a cellular network (e.g. calls through PBX 128) together with IP-PSTN gateway 140. Mediation server 138 may also act as a Session Initiation Protocol (SIP) user agent. In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system may include messaging server 142 for processing voicemails and similar messages, application server 144 for specific applications, and archiving server 146. Each of these may communicate with the data center pool of registrar and user services servers 136. Various components of the system may communicate using protocols like SIP, HTTP, and comparable ones.

A UC system, which is an example of enhanced communication systems with multimodal communication capability, may be implemented with any number of servers and specialized devices. Such systems are typically optimized for distribution of traffic. However, system capacity and usage are not always predictable or consistent. For example, an enterprise network spanning over different countries/time zones may experience capacity overload at certain times when a high number of users are communicating. In addition, unexpected events such as server/cluster/site failures may impact system capacity. When system capacity is reduced, quality of communication experience may be degraded for users. Sometimes, the requested sessions or modalities may not even be accommodated.

To address capacity problems, redundancy and load balancing may be employed through additional servers, specialized devices, and algorithms. Such measures may not always address specific scenarios. Depending on the network and enterprise size, some of the measures (e.g. load balancing systems) may not be cost-effective. Furthermore, each measure may add to the complexity of the enterprise network from a management and maintenance perspective. Embodiments are directed to reasonably manageable and cost-effective approaches for managing multimodal communications through diversion of select modalities over different networks such as the Internet while preserving expected quality of experience for users.

While the example system in FIG. 1 has been described with specific components such as registrar servers, mediation servers, A/V servers, and similar devices, embodiments are not limited to these components or system configurations and can be implemented with other system configuration employing fewer or additional components. Functionality of enhanced communication systems with modality diversion capability may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
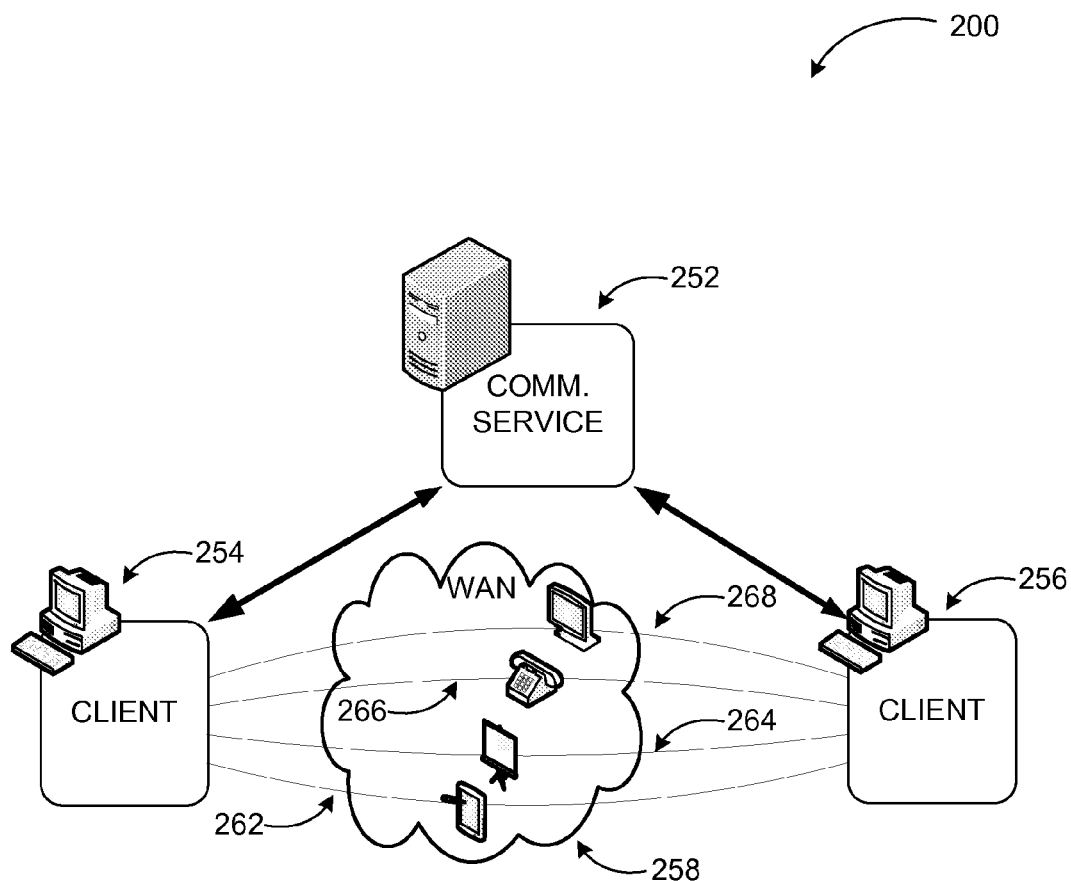
FIG. 2 is a conceptual diagram illustrating an example multimodal communication over a network managed by a communication service.

FIG. 2 is a conceptual diagram illustrating an example multimodal communication over a network managed by a communication service. As shown in diagram 200, a multimodal communication session is established between clients 254 and 256 managed by communication service 252. Clients 254 and 256 may be any communication application or device capable of handling various communication modalities. Example clients may vary from specialized devices capable of handling one or two modalities (e.g. advanced phones) to computing devices executing communication applications capable of handling any communication modality such as audio, video, data sharing, application sharing, and comparable forms. Diagram 200 shows two clients communicating, but embodiments are not limited to one-to-one (or peer-to-peer) communications. Multi-participant communication sessions such as audio/video conferences, online presentations, etc. may also be configured to employ modality diversion through different networks.

The example communication session of FIG. 2 includes text messaging 262, application sharing 264, audio communication 266, and video communication 268. The communication session is facilitated over an enterprise network 258, which is a wide area network (WAN). It should be noted, embodiments are not limited to particular network types. Networks including, but not limited to, wired networks (e.g. Ethernet), long or short range radio frequency (RF) communications (e.g. Wide Area Networks "WANs", Wireless Local Area Networks "WLANs", Personal Area Networks "PANs", etc.), optical communications (e.g. infrared), and similar ones may be used to facilitate multimodal communications according to embodiments.

Network 258 may comprise any topology of servers, clients, Internet service providers, and communication media. A system according to embodiments may have a static or dynamic topology. Furthermore, network 258 may include a secure network such as an enterprise network, an unsecure network such as a wireless open network, or the Internet. Network 258 may also comprise a plurality of distinct networks.

Figure 3:
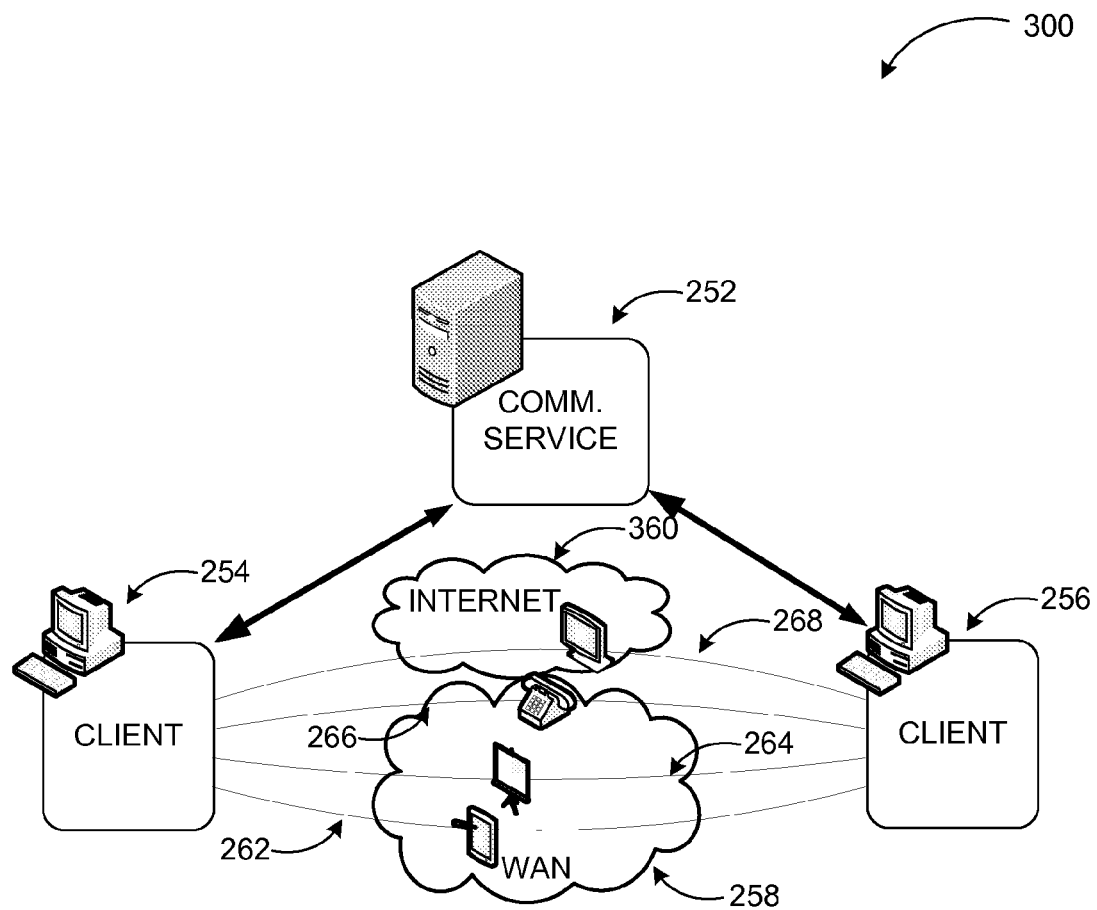
FIG. 3 is another conceptual diagram illustrating diversion of a modality in the example multimodal communication of FIG. 2 according to some embodiments.

FIG. 3 is another conceptual diagram illustrating diversion of a modality in the example multimodal communication of FIG. 2 according to some embodiments. As mentioned previously, network capacity based on availability of bandwidth, servers, usage, etc. may be limited in some cases to allow all requested modalities of a communication session to be facilitated.

In a system according to embodiments, one or more modalities may be diverted over another network to accommodate all requested modalities for the communication session while addressing capacity limitations of the original network. In the example scenario of diagram 300, text messaging 262, application sharing 264, and audio 266 modalities of the communication session are facilitated over the enterprise network 258 between clients 254 and 256. The video modality (268) is directed over the Internet 360 by communication service 252.

The decision of which modality to divert and when may be made by an administrator based on feedback from network monitoring devices/software or automatically by the communication service 252. A number of factors may be taken into consideration in the diversion decision process. For example, modalities requiring larger bandwidth may be selected over others requiring smaller bandwidth (e.g. video over text messaging). Type of modalities may also be a factor. For example, the enterprise network may be configured for optimum processing of certain modalities (e.g. application sharing). Therefore, those modalities may be facilitated over the original network. Moreover, attributes and/or number of the communication session and/or participants may also affect the decision. For example, modalities of a communication session designated as "secure" may not be diverted over open networks. Similarly, communication sessions between certain members of an organization (e.g. executives), which may possibly include proprietary or confidential information, may be limited to the original enterprise network. If a modality cannot be diverted for various reasons and no capacity is available (e.g. no other session can be diverted to make capacity available), an error message may be provided to the participants indicating part or all of the session cannot be accommodated at that time.

Figure 4:
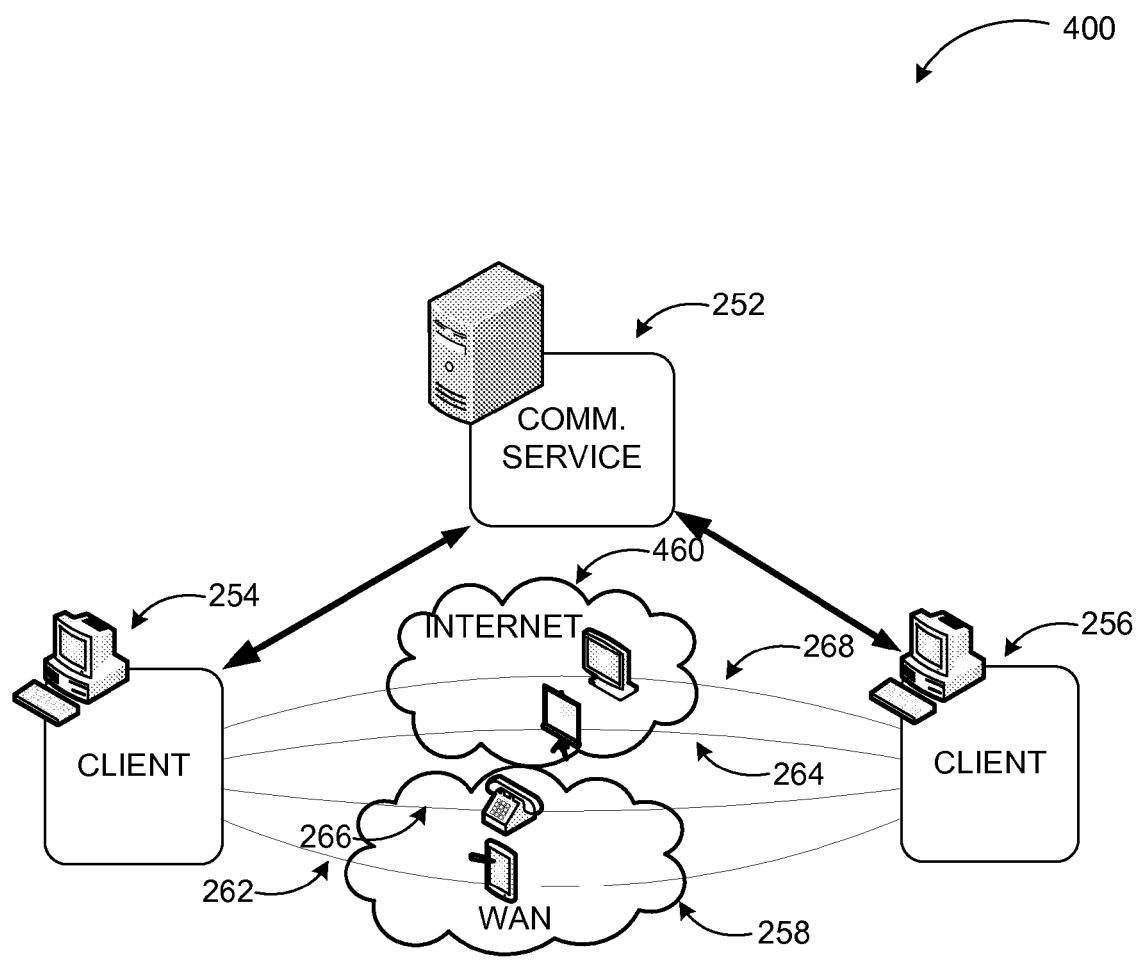
FIG. 4 is a further conceptual diagram illustrating diversion of two modalities in the example multimodal communication of FIG. 2 according to other embodiments.

FIG. 4 is a further conceptual diagram illustrating diversion of two modalities in the example multimodal communication of FIG. 2 according to other embodiments. Differently from diagrams 200 and 300, communication service 252 diverts the video and application sharing modalities (264 and 268) in the communication session between clients 254 and 256 in diagram 400. The diverted modalities are facilitated over Internet 460, while the remaining modalities are facilitated over the wide area network (WAN) 258.

In a system according to embodiments one or more (even all) modalities of a communication session may be diverted over multiple networks. Examples of such networks have been described previously. Thus, embodiments are not limited to diverting one or more modalities over the Internet as illustrated in diagram 400. For example, an organization may utilize a secure enterprise WAN and also participate for some operations in an open wireless network (e.g. a separate network for guests). When network capacity of the secure WAN is becoming overloaded, some modalities of communication sessions over the WAN may be diverted to the open wireless network. Furthermore, the diversion of the modalities may be performed when the communication session is being established or at any time during the communication. Communication service 252 may ensure seamless transition for the diverted modality such that participants do not experience degraded service quality.

Figure 5:
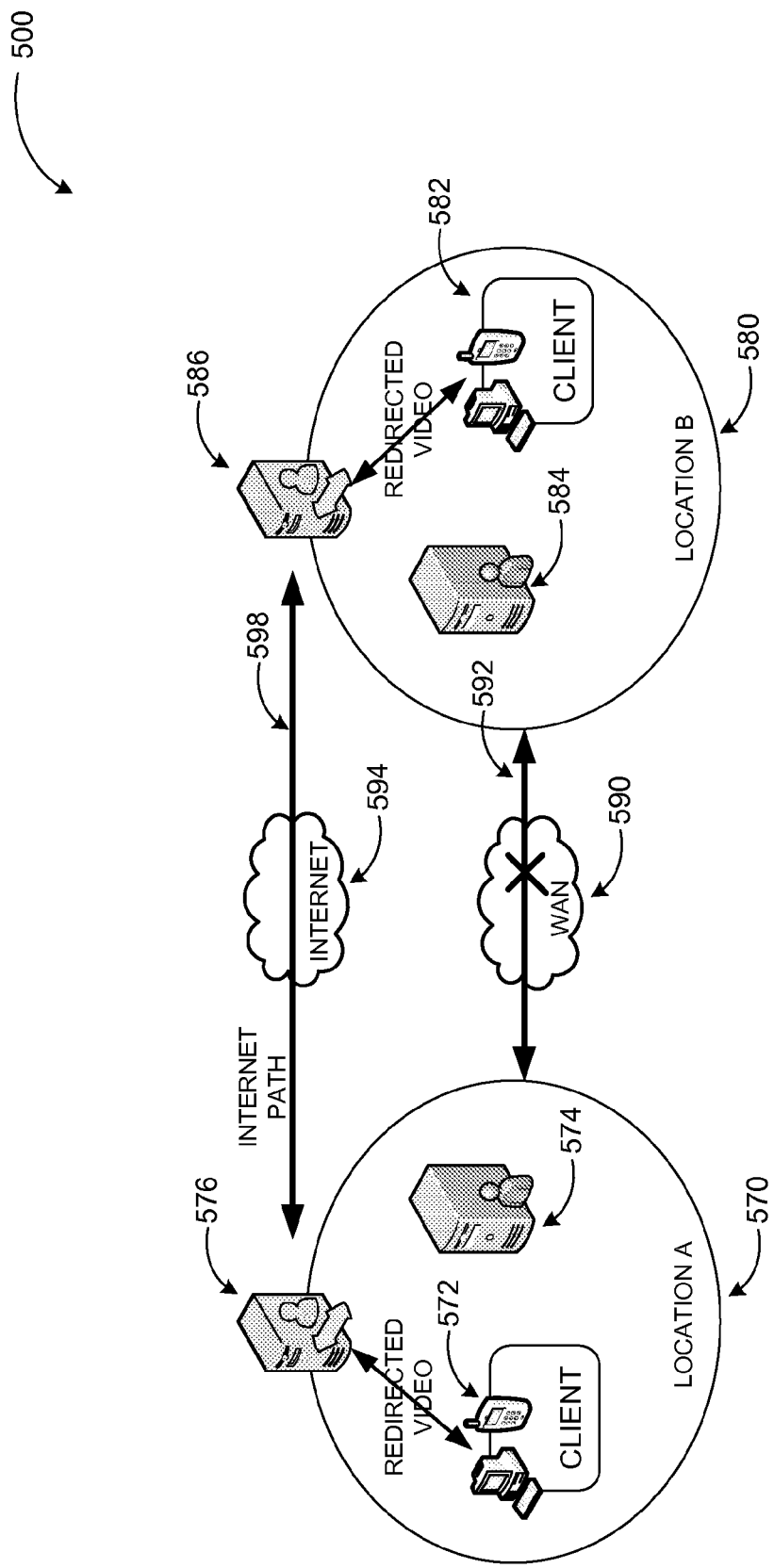
FIG. 5 illustrates an example diversion of video communication modality over the Internet instead of an enterprise network according to some embodiments.

FIG. 5 illustrates an example diversion of video communication modality over the Internet instead of an enterprise network according to some embodiments. The example communications in diagram 500 are between two sites (locations A and B) 570 and 580 of an enhanced communication system. Each site may include AV edge servers 576, 586 and communication servers 574, 584, respectively. While any number and type of clients may participate in a communication session facilitated according to embodiments, example clients 572 and 582 are illustrated in diagram 400.

Some enhanced communication infrastructures enable outside user and federation scenarios using Interactive Connectivity Establishment/Traversal Relay Using NAT (ICE/TURN) technologies. Sometimes, an AV edge server may also be used to establish calls between endpoints located in the enterprise network. However, routing of the media is controlled at the application layer. An administrator of the communication system may be enabled to select a modality and block that modality from using the enterprise WAN network 590 either on select WAN links or entirely. When the WAN path is completely blocked for a modality, the media (e.g. video modality) may be automatically redirected to AV edge servers 576, 586, which in turn stream media (598) through the Internet 594. This offload to the Internet 594 may be accomplished by the endpoints (clients 572, 582) being able to route to AV edge servers 576, 586, respectively, with bandwidth constraints.

As mentioned above, instead of blocking the entire WAN path 592, only some of the WAN links may also be blocked. Furthermore, other networks in addition to the Internet 594 may also be used to divert selected modalities. The modalities to be diverted and the time of diversion may be selected by an administrator or automatically by the system. This way, flexibility of controlling the media traffic within an enterprise network with richness of all collaboration modalities is achieved.

The example systems in FIG. 2 through 5 have been described with specific components such as AV edge servers, WANs, and with example communication modalities such as audio, video, text messaging, and the like. Embodiments are not limited to communication systems according to these example configurations. Furthermore, specific protocols are described for communication between different components. Embodiments are also not limited to the example protocols discussed above. Diversion of selected modalities in an enhanced communication system according to embodiments may be implemented using protocols, components, and configurations other than those illustrated herein employing fewer or additional components and performing other tasks.

Figure 6:
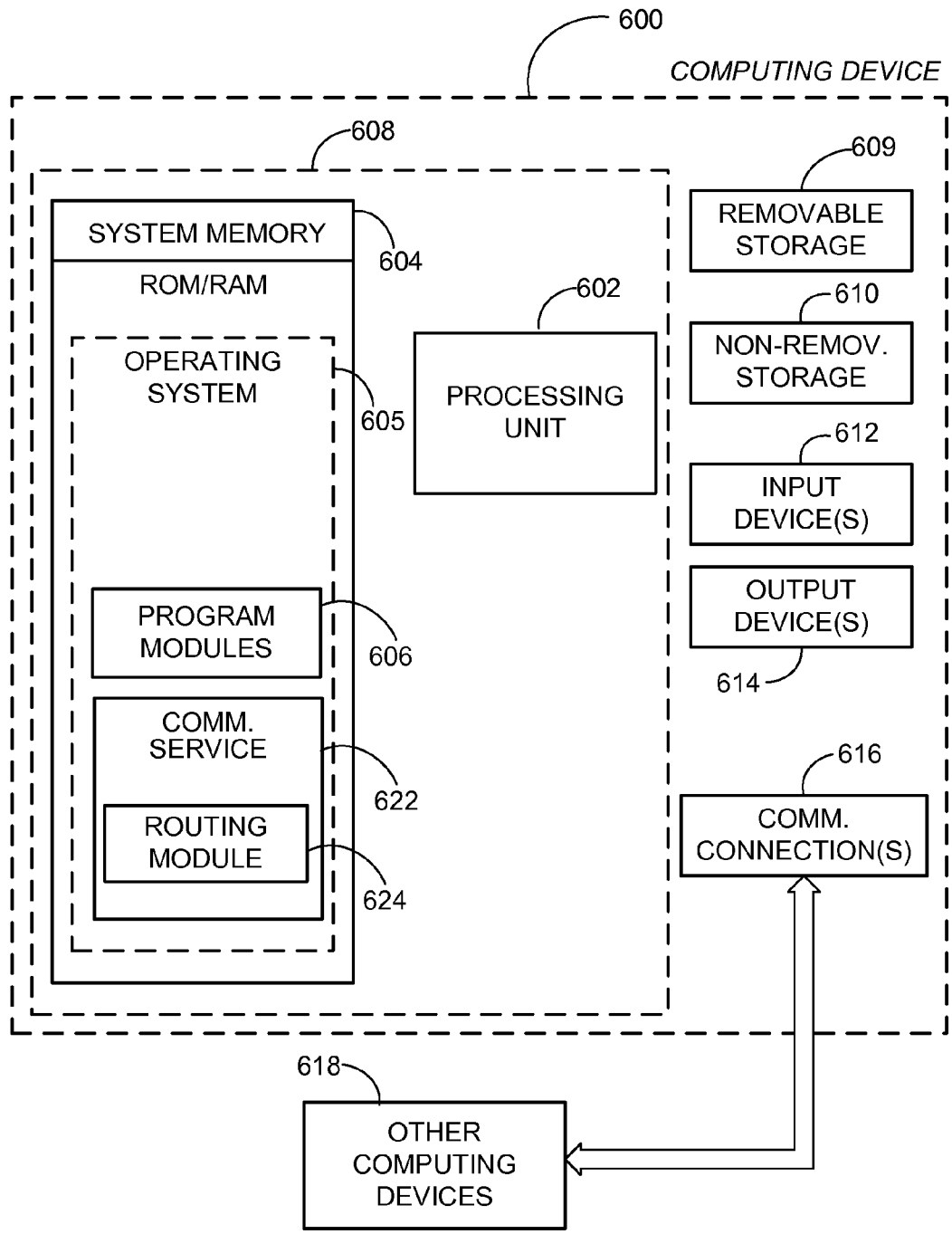
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server within a multi-modal enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication service 622, and routing module 624.

Communication service 622 may provide multimodal communication and ancillary services to clients, servers, and other components of the enhanced communication system as discussed above. As part of facilitating multimodal communication sessions, a routing module 624 may monitor network conditions, determine factors to be considered in diversion of select modalities, and alert an administrator to divert one or more modalities or execute the diversion automatically based on predefined rules. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
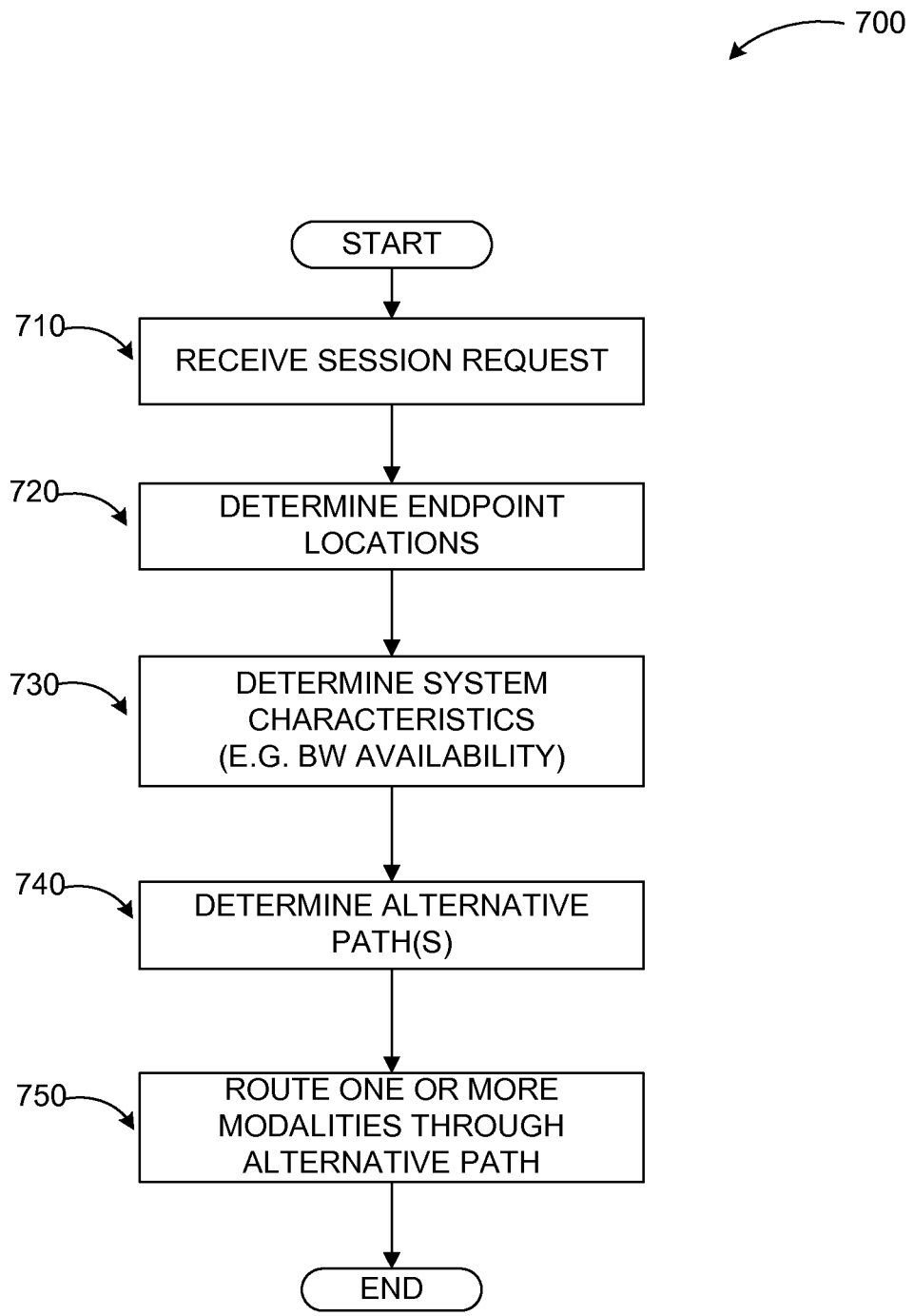
FIG. 7 illustrates a logic flow diagram for a process of modality diversion over alternative network paths for multimodal communications according to embodiments.

FIG. 7 illustrates a logic flow diagram for a process of modality diversion over alternative network paths for multimodal communications according to embodiments. Process 700 may be implemented as part of an enhanced communication system.

Process 700 begins with operation 710, where a communication session request is received at a communication service. The communication service may determine endpoint locations for the participants of the requested communication session at operation 720. The participants may be at the same location of at different geographic locations, which may limit available communication paths.

At operation 730, system characteristics may be determined. System characteristics, which are taken into consideration in diverting one or more modalities, may include a network capacity, a communication session type, a number of modalities in the communication session, types of modalities in the communication session, a number of participants in the communication session, an attribute of the communication session, attributes of the participants in the communication session, and comparable factors. Attributes of the participants may include an organizational position of each participant (e.g. executive). Communication session type may include a peer-to-peer communication or a one-to-many communication. Attribute of the communication session may include a confidential communication session, a proprietary communication session, and/or an open communication session.

At operation 740, alternative paths may be determined if bandwidth availability is an issue for the default path (e.g. enterprise WAN) for the requested communication session. At operation 750, the communication session may be facilitated by routing one or more of the requested modalities over one of the alternative paths based on the factors taken into consideration at operation 730. The alternative paths may include non-default links of a default network or non-default networks. According to other embodiments, the determination of alternative paths and system characteristics may be performed prior to receiving the request for the communication session.

The operations included in process 700 are for illustration purposes. Providing modality diversion for multimodal communication sessions in an enhanced communication system according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for diverting modalities of a multimodal communication session over different networks, the method comprising:
   receiving a request for a multimodal communication session;
   determining endpoint locations;
   determining system characteristics;
   determining alternative paths based on the endpoint locations and the system characteristics;
   facilitating the communication session by routing at least one modality of the communication session over an alternative path;
   determining a first modality associated with a larger bandwidth compared to other modalities and routing the first modality through a Wide Area Network (WAN);
   determining a second modality that includes application sharing and routing the second modality over an enterprise network;
   determining a number of participants and selecting the alternative path based on the number of participants;
   if the at least one modality has a secure designation, preventing the at least one modality from being routed over the alternative path established over an open network; and
   if the at least one modality is carrying at least one of: a proprietary information and a confidential information, limiting the at least one modality to an enterprise network.

2. The method of claim 1, wherein the system characteristics include at least one from a group of: a network capacity, a communication session type, a number of modalities in the communication session, types of modalities in the communication session, an attribute of the communication session, and attributes of the participants in the communication session.

3. The method of claim 2, wherein the attributes of the participants include an organizational position of each participant.

4. The method of claim 2, wherein the communication session type includes one of: a peer-to-peer communication and a one-to-many communication.

5. The method of claim 2, wherein the types of modalities include at least one from a group of: audio communication, video communication, text messaging, application sharing, data sharing, and online presentation.

6. The method of claim 2, wherein the attribute of the communication session includes one of: a confidential communication session, a proprietary communication session, and an open communication session.

7. The method of claim 1, wherein the alternative path is selected and the at least one modality routed over the alternative path by an administrator of a communication service managing the communication session.

8. The method of claim 1, wherein the alternative path is selected and the at least one modality routed over the alternative path automatically by a communication service managing the communication session.

9. The method of claim 1, further comprising:
   monitoring network conditions.

10. The method of claim 1, wherein the different networks comprise at least one from a group of: a wide area network (WAN), a local area network (LAN), and a personal area network (PAN), and wherein at least one of the networks is a secure network and one of the networks is the open network.

11. The method of claim 10, further comprising:
   routing at least one modality over a non-default network while remaining modalities are routed over a default network.

12. A server facilitating multimodal communication services with modality diversion in an enhanced communication system, the server comprising:
   a memory;
   a communication module; and
   a processor coupled to the memory and the communication module, wherein the processor executes a communication application adapted to:
   receive a request for a multimodal communication session;
   determine endpoint locations;
   determine network conditions;
   determine alternative paths based on the endpoint locations and the network conditions;
   select an alternative path for at least one modality of the requested communication session;

facilitate the requested communication session by routing the at least one modality of the communication session over the selected alternative path;

determine a first modality associated with a larger bandwidth compared to other modalities and route the first modality through a Wide Area Network (WAN);

determine a second modality that includes application sharing and route the second modality over an enterprise network;

determine a number of participants and select the alternative path based on the number of participants;

determine a number of communication sessions between the participants and further select the alternative path based on the number of communication sessions; and redirect a video modality from the at least one modality to another server for streaming through internet upon blocking of the selected alternative path for the video modality through the (WAN).

13. The server of claim 12, wherein the communication application is further adapted to route a plurality of modalities over at least three networks.

14. The server of claim 13, wherein at least one of the networks includes the Internet.

15. The server of claim 12, wherein the network conditions include at least one from a group of: a network capacity, a number of available servers, and a network usage.

16. The server of claim 12, wherein the server is an audio/video edge server of a unified communication system.

17. A computer-readable memory device with instructions stored thereon for facilitating multimodal communication services with modality diversion, the instructions comprising:

determining endpoint locations for participants in a multimodal communication session;

determining at least one from a group of: a network capacity, a number of available servers, and a network usage;

determining alternative paths based on the endpoint locations and network conditions;

selecting an alternative path for at least one modality of the communication session based on at least one from a group of: a communication session type, a number of modalities in the communication session, types of modalities in the communication session, a number of participants in the communication session, an attribute of the communication session, and attributes of the participants in the communication session;

facilitating the communication session by routing the at least one modality of the communication session over the selected alternative path;

determining a first modality associated with a larger bandwidth compared to other modalities and routing the first modality through a Wide Area Network (WAN);

determining a second modality that includes application sharing and routing the second modality over an enterprise network;

determining a number of participants and selecting the alternative path based on the number of participants;

determining a number of communication sessions between the participants and further selecting the alternative path based on the number of communication sessions;

if the at least one modality has a secure designation, preventing the at least one modality from being routed over the selected alternative path established over an open network;

if the at least one modality is carrying at least one of: a proprietary information and a confidential information, limiting the at least one modality to an enterprise network; and redirecting a video modality from the at least one modality to one of the available servers for streaming through internet upon blocking of the selected path alternative for the video modality the WAN.

18. The computer-readable memory device of claim 17, wherein the alternative path includes one of: a non-default link of a default network and a non-default network.

19. The computer-readable memory device of claim 18, wherein the default and non-default networks include at least one from a group of: a wired network, a wireless network, and an optical network.

20. The computer-readable memory device of claim 17, wherein the at least one modality is routed over the alternative path at one of: at the beginning of the communication session and at a time point during the communication session.

* * * * *